(12) United States Patent
Danielson et al.

(10) Patent No.: US 10,876,663 B2
(45) Date of Patent: Dec. 29, 2020

(54) FLUID CONNECTORS WITH CONNECTION STATE SENSING

(71) Applicant: FasTest, Inc., Roseville, MN (US)

(72) Inventors: Robert Danielson, Ham Lake, MN (US); Jake G. Clifton, Watertown, MN (US); Jason D. Clifford, Brooklyn Park, MN (US); William J. Rankin, Burnsville, MN (US); Jake Chandler, Minneapolis, MN (US)

(73) Assignee: FasTest, Inc., Roseville, MN (US)

( * ) Notice: Subject to any disclaimer, the term of this patent is extended or adjusted under 35 U.S.C. 154(b) by 1045 days.

(21) Appl. No.: 15/228,587

(22) Filed: Aug. 4, 2016

(65) Prior Publication Data
US 2017/0037991 A1    Feb. 9, 2017

Related U.S. Application Data

(60) Provisional application No. 62/201,278, filed on Aug. 5, 2015.

(51) Int. Cl.
*F16L 29/00* (2006.01)
*F16L 37/47* (2006.01)
*F16L 37/44* (2006.01)

(52) U.S. Cl.
CPC ............. *F16L 29/002* (2013.01); *F16L 37/44* (2013.01); *F16L 37/47* (2013.01); *F16L 2201/10* (2013.01); *F16L 2201/20* (2013.01)

(58) Field of Classification Search
CPC . F16L 2201/10; F16L 37/125; F16L 37/0847; F16L 37/0848
See application file for complete search history.

(56) References Cited

U.S. PATENT DOCUMENTS 3,896,280 A * 7/1975 Blake .................. F16K 37/0041
  200/81.9 M
7,458,400 B2  12/2008 Weh et al.
(Continued)

FOREIGN PATENT DOCUMENTS

GB    2484760    4/2012
WO    2005124712    12/2005

OTHER PUBLICATIONS

Chinese Office Action, issued in the corresponding Chinese patent application No. 201680044865.5, dated Apr. 2, 2019, 12 pages including translation.
(Continued)

*Primary Examiner* — David Bochna
(74) *Attorney, Agent, or Firm* — Hamre, Schumann, Mueller & Larson, P.C.

(57) ABSTRACT

Fluid connectors are described where one or more sensors are provided for sensing a connection state of the fluid connectors. The sensor(s) indicates that the fluid connector of the first fluid system is connected to the second fluid system prior to initiating fluid flow between the first and second fluid systems. The sensor(s) senses movements of one or more elements of the quick connect fluid connectors that are involved in the actual connection of the fluid connectors to the second fluid system. The elements that are sensed can be, for example, one or more cylindrical sleeves of the connector or a piston of the connector. Therefore, the connection state of the fluid connectors can be determined accurately.

8 Claims, 11 Drawing Sheets

(56) References Cited

U.S. PATENT DOCUMENTS

| | | | |
|---|---|---|---|
| 7,841,357 B2 | 11/2010 | Rankin | |
| 8,539,997 B2 * | 9/2013 | Driftmeyer | B67D 7/42 |
| | | | 137/554 |
| 8,746,745 B2 * | 6/2014 | Colman | F16L 37/244 |
| | | | 285/93 |
| 8,844,979 B2 | 9/2014 | Danielson | |
| 2003/0033868 A1 * | 2/2003 | Posey | F16K 5/0647 |
| | | | 73/168 |
| 2005/0011556 A1 * | 1/2005 | Dudzik | F15B 13/0402 |
| | | | 137/554 |
| 2005/0127314 A1 | 6/2005 | Piehl et al. | |
| 2006/0207345 A1 * | 9/2006 | Rankin | B41J 2/175 |
| | | | 73/861.93 |
| 2007/0209716 A1 * | 9/2007 | Rankin | F16L 37/0841 |
| | | | 137/554 |
| 2011/0240136 A1 | 10/2011 | Trottier | |
| 2012/0199770 A1 | 8/2012 | Alessandro | |
| 2012/0267007 A1 | 10/2012 | Driftmeyer et al. | |
| 2013/0174928 A1 | 7/2013 | Danielson | |
| 2014/0203200 A1 | 7/2014 | Da Silva | |
| 2015/0068623 A1 * | 3/2015 | Szeteli | F16L 15/08 |
| | | | 137/551 |
| 2016/0229680 A1 * | 8/2016 | Cornett | F16L 55/1015 |
| 2019/0301648 A1 * | 10/2019 | Leckner | F16L 37/084 |

OTHER PUBLICATIONS

International Search Report and Written Opinion for PCT/US2016/045567, dated Nov. 7, 2016 (11 pages).

\* cited by examiner

FLUID CONNECTORS WITH CONNECTION STATE SENSING

FIELD

Quick connect fluid connectors are described that include sensors for sensing a connection state of the fluid connectors.

BACKGROUND

Quick connect fluid connectors are known for connecting fluid systems to one another to transfer fluids from one system to another. In one exemplary application, in industrial fill plants, quick connect fluid connectors are used at fill stations to connect to gas cylinders to process the cylinders. The cylinders can vary from, for example, the relatively smaller, portable oxygen cylinders for personal medical use to large gas cylinders used for welding. Some quick connect fluid connectors require threading and un-threading of the connector to achieve connection which can create fatigue on the operator. In addition, the quicker the connection/disconnection of the connector, the less time that is required to process a cylinder. In addition, in view of the high pressures involved, disconnection of the connector while under pressure needs to be avoided. Also, it is important to ensure that the connector is actually connected before processing occurs to avoid accidental disconnection once the high pressure fluid begins to flow.

U.S. Pat. No. 8,844,979 describes examples of quick connect fluid connectors that can be used for transferring fluids, including gaseous or liquid fluids, between first and second fluid systems, for example for filling gas cylinders.

U.S. Pat. No. 7,841,357 describes a fluid connector that uses a magnet and a sensor to sense movement of a piston. Based on the sensed movement of the piston, a connection state of the connector is estimated. In U.S. Pat. No. 7,841,357, an assumption is made that connection has been achieved based on piston movement. However, even though the piston may have moved to a fully open position, the connection member described therein may not have achieved proper connection to the mating coupler, for example due a failure of the connection member or use of an improper mating coupler. Therefore, the fluid connector in U.S. Pat. No. 7,841,357 can still become disconnected under pressure even though complete movement of the piston has been detected.

SUMMARY

Examples of quick connect fluid connectors are described that can be used to connect a first fluid system to a second fluid system for transferring fluids between the first and second fluid systems. As used herein, the term fluid can include gases, liquids or mixtures of both. In one exemplary application, the described quick connect fluid connectors can be used at a fill station in an industrial fill plant for filling gas cylinders. However, the described quick connect fluid connectors can be used for any application to connect a first fluid system to a second fluid system to transfer a fluid between the two systems.

In the described fluid connectors, one or more sensors are provided for sensing a connection state of the fluid connectors. The sensor(s) indicates that the fluid connectors of the first fluid system are connected to the second fluid system prior to initiating fluid flow between the first and second fluid systems. The sensor(s) senses movements of one or more elements of the quick connect fluid connectors that are involved in the actual connection of the fluid connectors to the second fluid system. The elements that are sensed can be, for example, one or more cylindrical sleeves of the connector or a piston of the connector. Therefore, the connection state of the fluid connectors can be determined accurately.

In one embodiment, the fluid connectors described herein share some features that are similar in construction and operation to features in the fluid connectors described in U.S. Pat. No. 8,844,979 which is incorporated herein by reference in its entirety.

DRAWINGS

DETAILED DESCRIPTION

Figure 1:
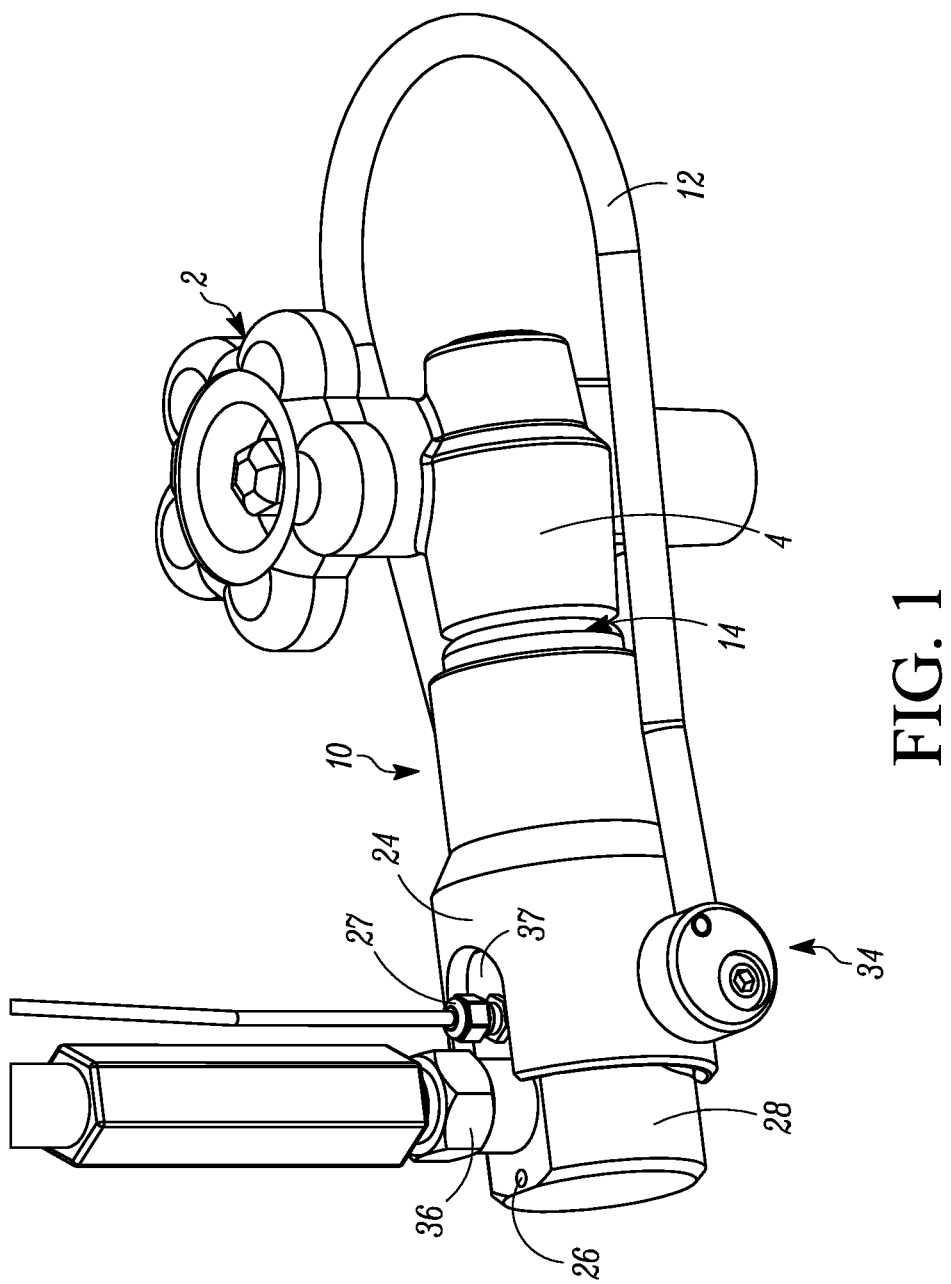
FIG. 1 is a perspective view of one embodiment of a quick connect fluid connector connected to a valve of a gas cylinder.

As used herein, unless otherwise defined, the term fluid can include gases, liquids or mixtures of both.

The described quick connect fluid connectors can be used for any application to connect a first fluid system to a second fluid system to transfer a fluid between the two systems. One exemplary non-limiting application of a fluid connector is for use at a fill station in an industrial fill plant for filling gas cylinders. However, many other applications of the described fluid connectors are possible.

In the fluid connectors described further below, one or more sensors are provided for sensing a connection state of the fluid connectors. The sensors monitor internal components of the fluid connectors to indicate that the fluid connectors of the first fluid system are connected to the second fluid system prior to initiating fluid flow between the first and second fluid systems. The sensors are arranged in the fluid connectors to sense movements of one or more elements of the fluid connectors that are involved in the actual connection of the fluid connectors to the second fluid system. This permits the connection state of the fluid connectors to be determined accurately.

With reference initially to FIGS. 1-7, a first embodiment of a quick connect fluid connector 10 for connection to a valve 2 of a gas cylinder will be described. The construction of the valve 2 and the gas cylinder are conventional. The valve 2 controls the ingress and egress of fluid, in this case gas, to and from the cylinder. The valve includes a processing port 4 designed to engage with a connection mechanism of the connector 10 and through which gas is introduced into or discharged from the gas cylinder.

In the fluid connector 10, two separate elements within the fluid connector 10 are monitored to verify that connection was made to the valve 2. A handle 12 can be manually rotated up to release the connection, and the handle 12 can be manually rotated back down without achieving connection to the valve 2. This movement alone cannot trigger a proper connection. Also, a front sleeve 14 is retracted into the connector 10 when a proper connection is made and also when the handle 12 is up in a disconnect mode. This front sleeve 14 motion alone cannot trigger a proper connection. Consequently, two sensors 16, 18 (discussed further below) are provided that detect magnets 20, 22 housed in the front sleeve 14 and an outer sleeve 24, respectively. When the sensors 16, 18 properly detect the magnetic fields of the magnets, a signal can be relayed to a central processor that the connection is complete and it is safe to initiate flow of fluid through the fluid connector. In some embodiments, a light 26, for example a green light, mounted on the fluid connector 10 can be illuminated showing a human operator of the fluid connector 10 that connection has been achieved. Signals from the sensors 16, 18 can be directed from the connector 10 via a wired connection 27 of the fluid connector 10. In other embodiments, signals from the sensors 16, 18 can be transmitted wirelessly via a suitable transmission mechanism, for example a transceiver (not shown).

Figure 2:
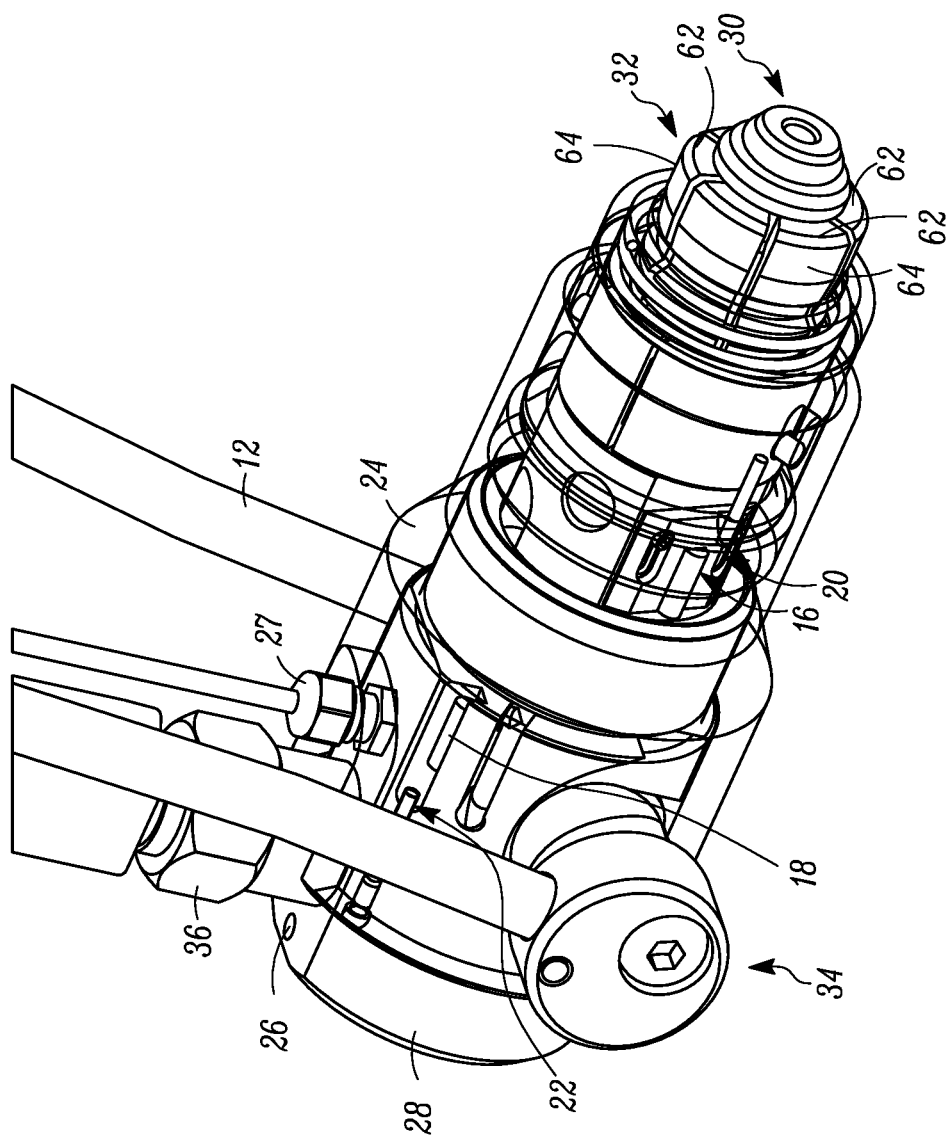
FIG. 2 is a perspective view of the fluid connector of FIG. 1 with the outer sleeve made transparent to better illustrate the sensors, and the handle up in a disconnected state of the fluid connector.
Figure 4:
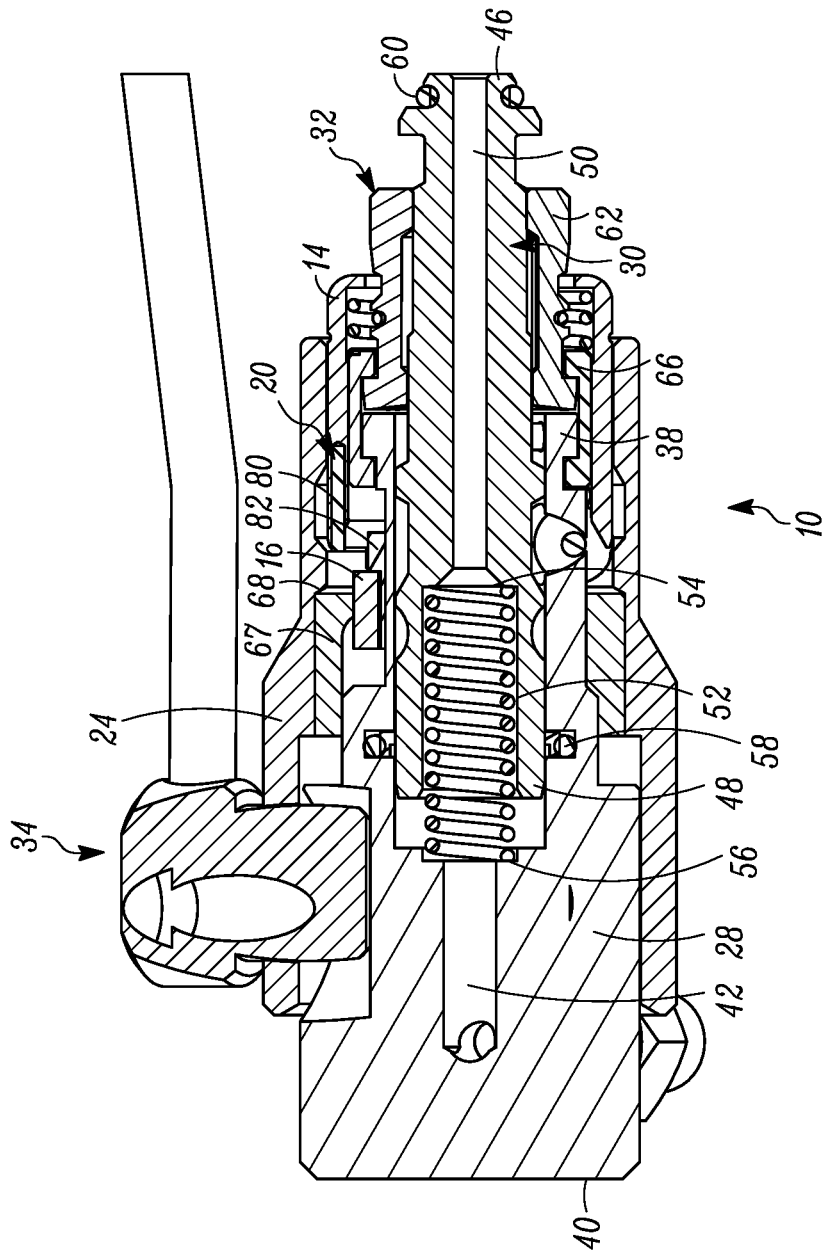
FIG. 4 is a cross-sectional view of the connector showing the positions of a front sensor and a front magnet.

Referring to FIGS. 2 and 4, the connector 10 includes the cylindrical outer sleeve 24 that defines a longitudinal axis, a main body 28, a piston 30, the front sleeve 14, a connection mechanism 32, and an actuation mechanism 34.

The main body 28 is disposed at least partially in and surrounded by the outer sleeve 24. In the illustrated embodiment, the main body 28 is almost entirely disposed within the outer sleeve 24 except for a small portion of a rear end of the main body 28 and a nipple 36 fixed to the main body 28 that defines a fluid port and that projects beyond an exterior of the outer sleeve 24 with the nipple 36 disposed generally at a 90 degree angle relative to the longitudinal axis of the connector 10. The nipple 36 may also be disposed so that the flow path defined thereby is straight through the connector parallel to the longitudinal axis or disposed at angles other than 90 degrees.

As seen in FIG. 1, the wired connection 27 can be described as being located in front of the nipple 36; or located between the nipple 36 and the front end of the sleeve 24; or disposed on the main body 28 so that the wired connection 27 is in a slot 37 that is formed in the sleeve 24 in which the wired connection 27 and the nipple 36 can travel; or the nipple 36 is between the wired connection 27 and the rear end of the main body 28. Regardless of how the location of the wired connection 27 is described, the wired connection 27 is protected by the nipple 36 from accidental damage by an operator of the fluid connector 10.

The main body 28 and the outer sleeve 24 are slideable relative to one another parallel to the longitudinal axis. The main body 28 includes a first or front main body end region 38, and a second or rear main body end region 40. In addition, the main body 28 defines a fluid passageway 42 that is in fluid communication with the fluid passageway of the nipple 36 so that fluid can flow between the nipple 36 and the fluid passageway 42.

Further, an actuation slot 44 (see FIG. 3) is defined in the main body 28 adjacent to the second main body end region 40 which receives a part of the actuation mechanism 34 as described further below. In the illustrated embodiment, the actuation slot 44 is downward facing with the bottom of the slot closed off by the outer sleeve 24. However, other orientations of the actuation slot are possible. Further information on the construction and operation of the slot 44 can be found in U.S. Pat. No. 8,844,979 which is incorporated herein by reference in its entirety.

With reference to FIG. 4, the piston 30 is a cylindrical member that is disposed at least partially within the main body 28, and the piston 30 is slideable relative to the main body 28 parallel to the longitudinal axis. The piston 30 includes a first piston end region 46 that projects axially beyond the first main body end region 38, a second piston end region 48 disposed within the main body 28, and a fluid passageway 50 that extends from the first piston end region 46 and is in fluid communication with the fluid passageway 42 of the main body 28.

The interior of the piston end region 48 is hollowed out to have a larger diameter than the fluid passageway 50 and the hollowed out end region 48 receives a spring 52, for example a coil spring, that abuts at one end against a shoulder 54 defined within the piston 30 and abuts at its opposite end against a shoulder 56 defined in the main body 28. The spring 52 biases the piston 30 in a direction toward the right in FIG. 4, i.e. toward the valve 2 or in a direction away from the end region 40 of the main body. A seal 58, for example a slip seal and an o-ring seal, is provided between the outer surface of the piston 30 and the inner surface of the main body 28 to prevent fluid leakage between the piston 30 and the main body 28.

The end region 46 of the piston 30 includes a seal 60, for example an elastomeric o-ring seal, disposed thereon intended for sealing with an interior surface within the processing port 4.

The connection mechanism 32 is mounted to the first main body end region 38 and is designed for connection to the processing port 4. The connection mechanism 32 can be any type of connection mechanism conventionally used on quick connect fluid connectors for connection with the processing port 4. In the illustrated example, the connection mechanism 32 includes a plurality of collets 62 with external threads 64 at an end thereof for gripping with internal threads in the processing port 4. Opposite ends of the collets 62 are secured to the end region 38 by a circumferential retaining ring 66. The collets 62 are pivotable about their rear ends adjacent to the end region 38, and can be forced radially outward into gripping engagement with the interior of the port 4 by retracting of the end region 46 of the piston 30 into the connector 10. This construction and operation of the collets 62 is conventional and would be well understood by persons of ordinary skill in the art.

An inner sleeve 67 is cylindrical, surrounds the main body 28, and is disposed within and surrounded by the cylindrical sleeve 24. The inner sleeve 67 is mounted so as to be moveable independently of the cylindrical sleeve 24 and the main body 28. A plurality of balls (not visible) are disposed between the interior surface of the inner sleeve 67 and the outer surface of the piston 30 which defines a circumferential recess that receives the balls. The sleeve 24 includes an inner shoulder 68 that abuts with the inner sleeve 67. The shoulder 68 of the sleeve 24 is engageable with the inner sleeve 67 which pulls the inner sleeve 67 back. As the inner sleeve 67 is pulled back, it engages the balls which are engaged with the piston 30, thereby pulling the piston back. Further information on the construction and operation of the inner sleeve 67 and the balls can be found in U.S. Pat. No. 8,844,979 which is incorporated herein by reference it its entirety.

The actuation mechanism 34 is configured to actuate the collets 62 from a disconnected position to a connected position. As discussed above, the actuation mechanism 34 interacts with the slot 44 in the main body 28 for actuating the main body 28 relative to the outer sleeve 24 to retract the main body 28 relative to the sleeve 24. As this occurs, the collets 62 are forced radially outward by the front end region 46 of the piston 30 to their connected position.

The actuation mechanism 34 includes a pair of cylinders 70 and an eccentric mounted roller mechanism 72 that interconnects the cylinders 70. The handle 12, for example a bail handle, is connected at each end thereof to the cylinders 70 for rotating the cylinders 70. Further information on the construction and operation of the cylinders 70 and the roller mechanism 72 can be found in U.S. Pat. No. 8,844,979 which is incorporated herein by reference it its entirety.

Figure 3:
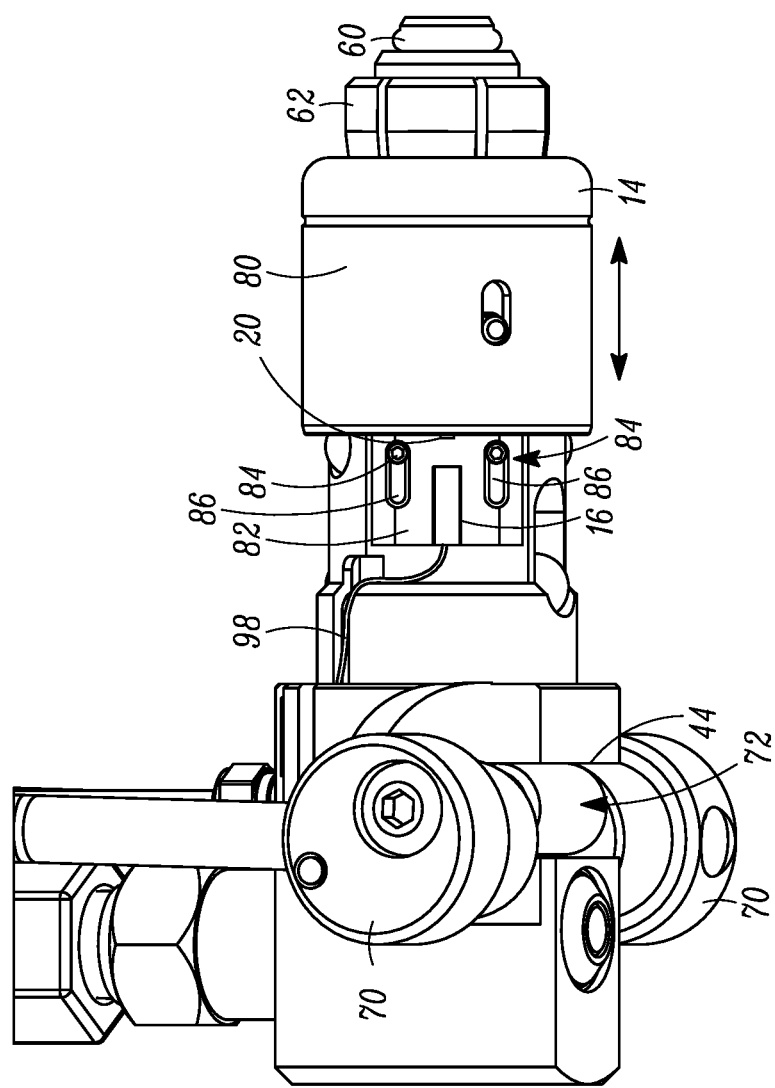
FIG. 3 is a perspective view of the fluid connector of FIG. 1 with the outer sleeve removed for clarity.

With reference to FIGS. 3 and 4, the front sleeve 14 is cylindrical and surrounds the collets 62 and the retaining ring 66, and at least a portion of the sleeve 14 is surrounded by the sleeve 24. The front sleeve 14 is movable axially or longitudinally backward and forward relative to the sleeve 24 and relative to the main body 28. The front sleeve 14 is an alignment sleeve that helps to guide the connector 10 onto the processing port 4 and to give the connector stability against the processing port 4 for proper connection. Further information on the construction and operation of the front sleeve 14 can be found in U.S. Pat. No. 8,844,979 which is incorporated herein by reference it its entirety.

The front sleeve 14 includes the magnet 20 connected thereto. The magnet 20 is illustrated as being connected to a rear end 80 of the front sleeve 14. The sensor 16 is mounted on a support structure 82 that is fixed to the main body 28. As the front sleeve 14 moves relative to the main body 28, the sensor 16 senses the position of the magnet 20. As best seen in FIG. 3, the support structure 82 can be fixed to the main body 28 via one or more mechanical fasteners 84, for example screws, disposed through axial slots 86 formed in the support structure 82. The fasteners 84 and the axial slots 86 permit axial or longitudinal adjustment of the position of the sensor 16 relative to the magnet 20 by loosening the fasteners 84 which permits adjustment of the position of the support structure 82, and the fasteners 84 can then be tightened to fix the position of the support structure.

Figure 5:
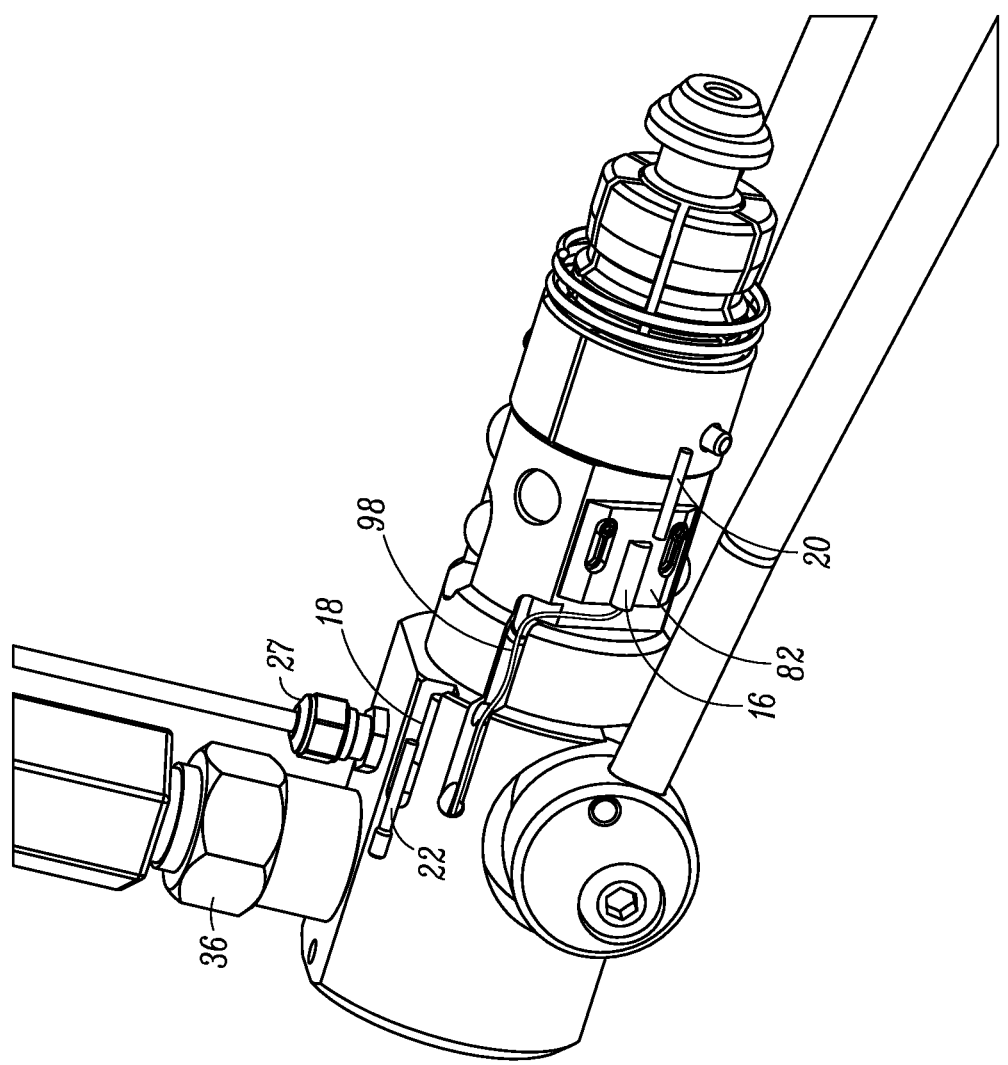
FIG. 5 is a perspective view of the fluid connector of FIG. 1 with the outer sleeve and the front sleeve removed for clarity.
Figure 6:
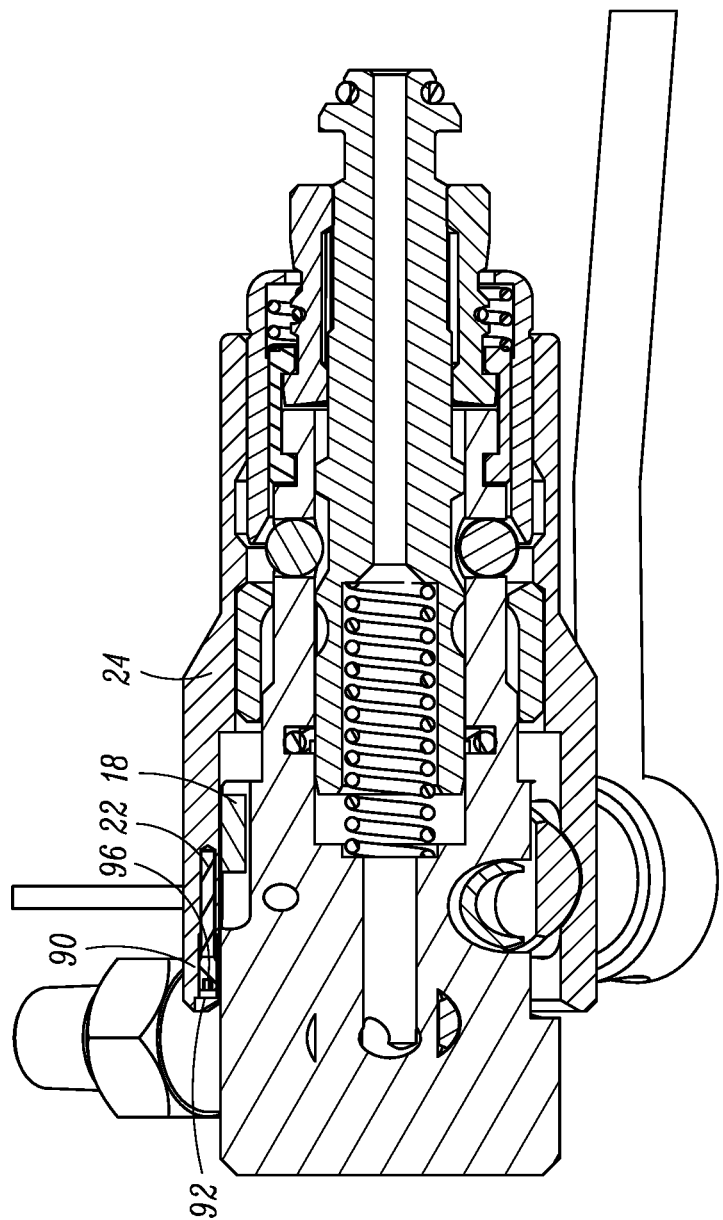
FIG. 6 is a cross-sectional view of the connector showing the positions of a rear sensor and a rear magnet.
Figure 7:
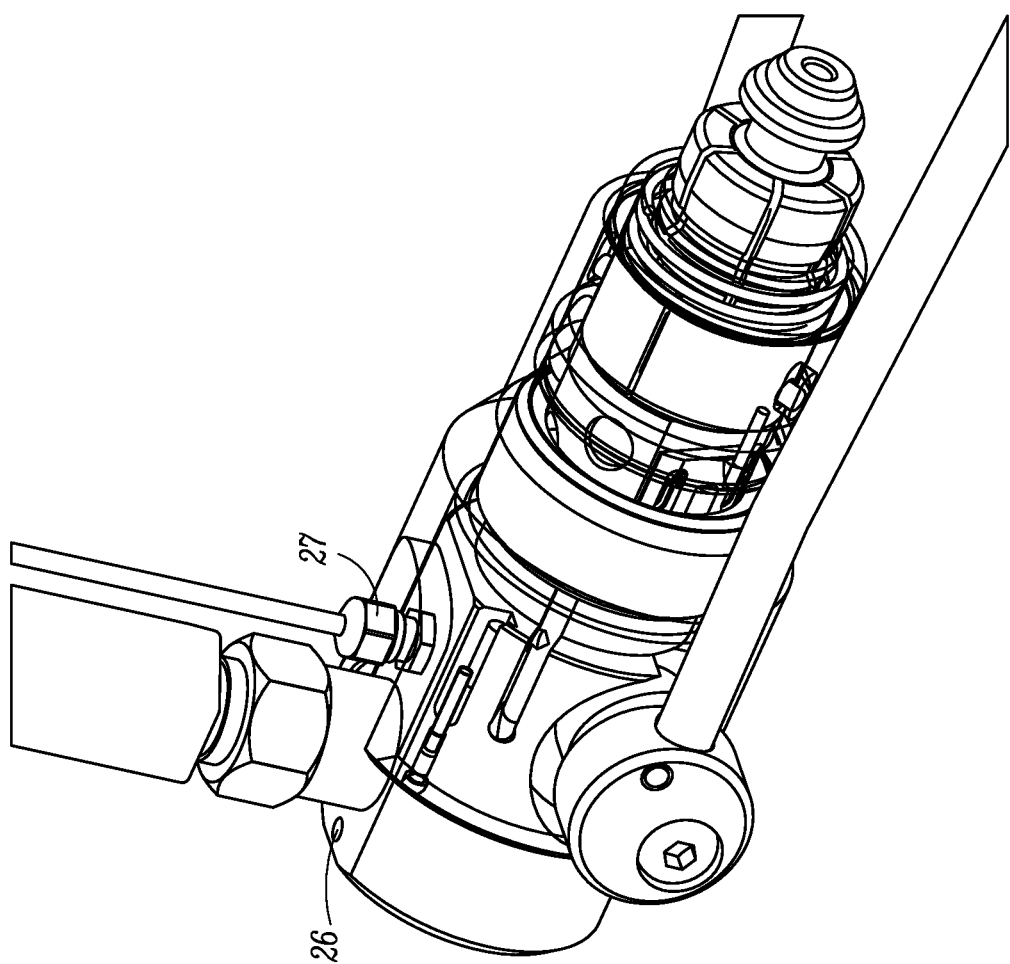
FIG. 7 is a perspective view of the fluid connector with the outer sleeve made transparent and the handle down in a connected state of the fluid connector.

Referring to FIGS. 5 and 6, the sleeve 24 includes the magnet 22 connected thereto. The magnet 22 is illustrated as being connected to a rear end 90 of the sleeve 24. For example, the magnet 22 can be disposed within an axial or longitudinal threaded aperture 92 formed in the thickness of the sleeve 24 and that extends through the rear end 90. The magnet 22 is magnetically attracted to a set screw 96 that is threaded into the aperture 92. As the set screw 96 is threaded in and out relative to the aperture 92, the magnet 22 moves with the set screw 96 so that the position of the magnet 22 can be adjusted forwardly and rearwardly.

The sensor 18 is mounted on the main body 28. As the sleeve 24 moves relative to the main body 28, the sensor 18 senses the position of the magnet 22. Wires (not shown) extend from the sensor 18 and out the wired connection 27.

Similarly, wires 98 extend from the sensor 16 and out the wired connection 27. As the connector 10 is connected to the valve 2, the magnets 20, 22 in the front sleeve 14 and the outer sleeve 24, respectively, move to positions that can be read by the sensors 16, 18. Signals are sent from the sensors 16, 18 out the wired connection 27 to a suitable control. When the control determines that both of the sensors 16, 18 detect the magnetic fields of the magnets 20, 22, the control can send a signal allowing fluid to flow between the connector 10 and the valve 2. Optionally, the light 26 can also be illuminated. If only one magnet is detected, the control does not initiate fluid flow. In an optional embodiment, suitable control can be mounted on the connector 10 to which the signals from the sensors 16, 18 can be sent.

Figure 13:
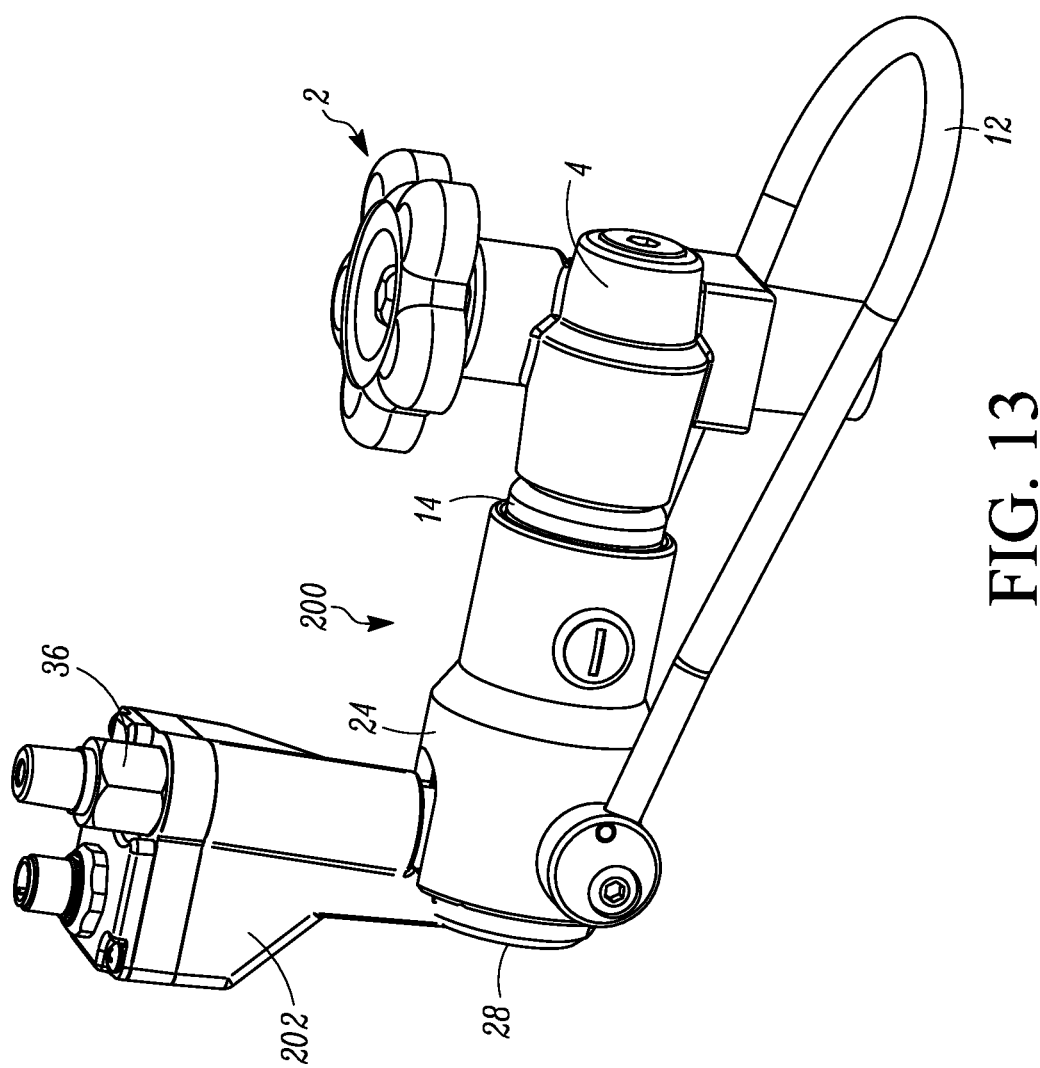
FIG. 13 is a perspective view of another embodiment of a fluid connector that is similar to the embodiment in FIGS. 1-7 but with a housing at the rear of the fluid connector.

FIG. 13 is a perspective view of another embodiment of a fluid connector 200 that is similar to the fluid connector 10 in FIGS. 1-7. As with the fluid connector 10, in the fluid connector 200 two separate elements within the fluid connector 200 are monitored to verify that connection was made to the valve 2. The connector 200 includes the cylindrical outer sleeve 24, the main body 28, the piston 30, the front sleeve 14, the connection mechanism 32, the actuation mechanism 34, the sensors 16, 18, and the magnets 20, 22 all discussed above with respect to the fluid connector 10.

The fluid connector 200 differs from the fluid connector 10 in that a housing 202 is provided at the rear of the fluid connector 200. The housing 202 houses the wired connection 27 and houses the light 26 for instant feedback of connection status, and houses the electronics to convert feedback from the sensors 16, 18 into a usable output.

FIGS. 8-12 illustrate another embodiment of a fluid connector 100 with a connection state sensor. In the connector 100, a pneumatic actuated piston squeezes a rubber seal to extrude the rubber seal against a mating part so that the fluid connector 100 grips the mating part. As air pressure is introduced into a pilot port in the connector, the piston is energized and squeezes the rubber seal until it contacts the mating part. The movement of the piston is monitored such that it can be determined when the connector 100 is fully actuated and in gripping contact with the mating part. To accomplish this, a magnet is provided that is atop a push pin that is spring loaded and rides on the moving piston. As the magnet moves, the flux lines are detected and their angular displacement is associated with the piston travel.

Figure 8:
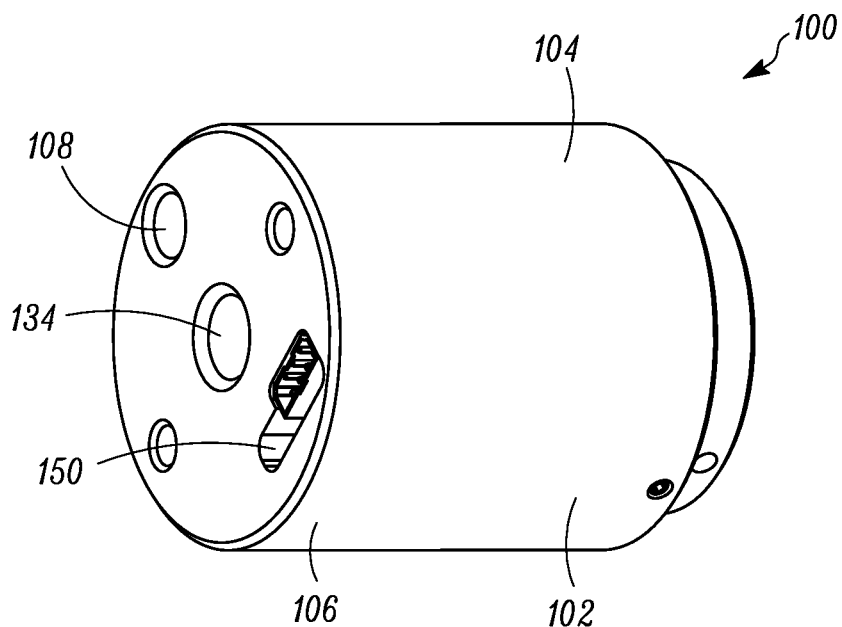
FIG. 8 is a perspective view of another embodiment of a quick connect fluid connector with a connection state sensor.
Figure 9:
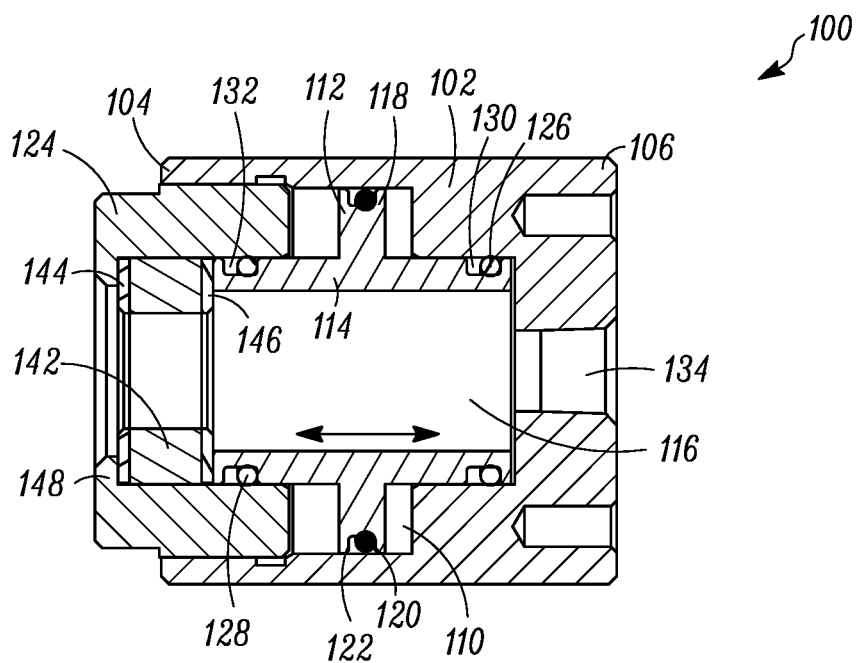
FIG. 9 is a cross-sectional view of the fluid connector of FIG. 8.

Referring to FIGS. 8 and 9, the fluid connector 100 includes an outer cylindrical housing 102 having a front end 104 and a rear end 106. A pilot port 108 is formed in the rear end 106 through which air or other piston actuating fluid can flow in communication with a cavity 110 on one side of a piston 112 for actuating the piston 112 in a forward direction or toward the front end 104 as indicted by the double headed arrow in FIG. 9. Return movement of the piston 112 (or movement in a rearward direction) is provided by a seal (discussed below) returning to its default shape.

The piston 112 is slidably disposed within an interior of the housing 102. The piston 112 includes a cylindrical body 114 that defines a fluid passageway 116 through the body 114. A larger diameter circumferential rim 118 is integrally formed on the body 114 and projects radially outward therefrom. A perimeter of the rim 118 is closely adjacent to an interior surface of the housing 102, and a seal 120, for example an elastomeric o-ring, can be disposed in a channel 122 formed in the edge of the rim 118 to seal with the interior surface of the housing 102 and prevents fluid leakage out of the cavity 110 past the rim 118. In addition, the outside surface of the body 114 is closely adjacent to an interior surface of the housing 102 and to an interior surface of a front sleeve 124, and seals 126, 128, for example elastomeric o-rings, can be disposed in channels 130, 132 formed at opposite ends of the body 114 to seal with the interior surfaces and prevent fluid leakage past the seals 126, 128.

A fluid port 134 formed in the rear end 106 is in fluid communication with the fluid passageway 116 through the body 114 to allow fluid to pass between the passageway 116 and the port 134.

The front sleeve 124 is partially disposed within the housing 102 with a front end of the sleeve 124 extending from the front end 104 of the housing 102. The sleeve 124 forms part of a connection mechanism for connecting the fluid connector 100 to a mating part 140, such as a tube, (see FIG. 12) through which a fluid can flow to and from the fluid connector 100.

The connection mechanism also includes a seal 142, for example a rubber seal that is disposed between a pair of washers 144, 146. The washer 144 is disposed between the front end of the seal 142 and a flange 148 projecting radially inwardly from the sleeve 124. The washer 146 is disposed between the rear end of the seal 142 and the end of the body 114.

Figure 12:
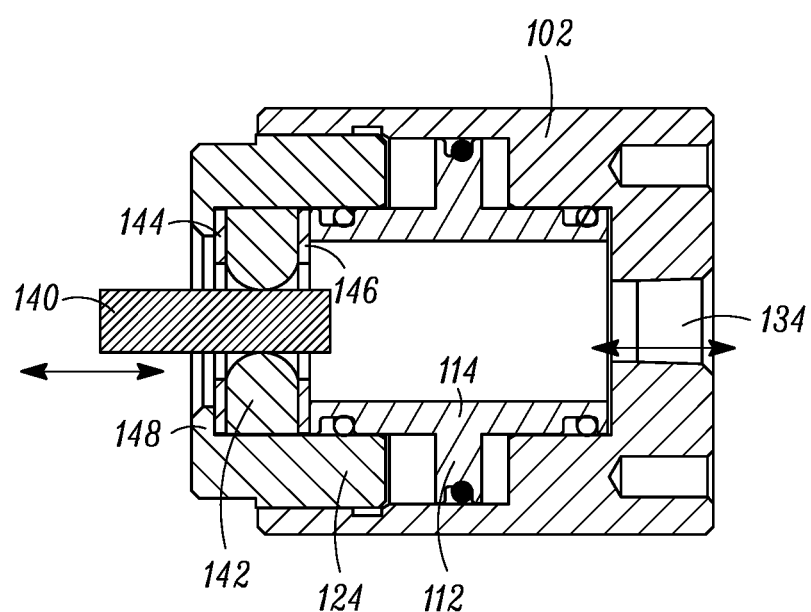
FIG. 12 is a cross-sectional view of the fluid connector showing the seal in a connected state of the connector.

When the piston 112 is actuated to the left in FIG. 9, the piston 112 pushes against the washer 146, squeezing the seal 142 between the washers 144, 146. The seal 142 is made of sufficiently resilient material to allow the seal 142 to extrude radially inward as shown in FIG. 12 when it is squeezed between the washers 144, 146. When the seal 142 is extruded, it seals with and grips around the mating part 140.

Figure 10:
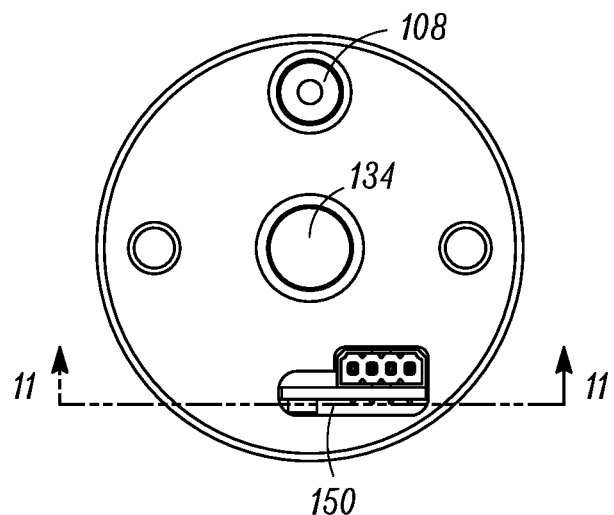
FIG. 10 is an end view of the fluid connector of FIG. 8.
Figure 11:
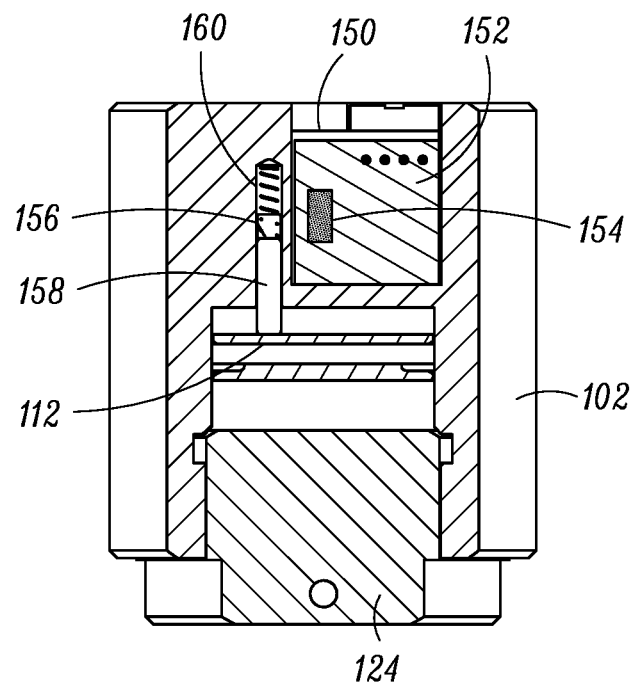
FIG. 11 is a cross-sectional view taken along line 11-11 of FIG. 10.

As seen in FIGS. 8 and 10-11, a slot 150 is formed in the rear end 106 of the housing 102, and a sensor chip 152 is inserted into the slot 150. The sensor chip 152 includes a magnetic flux sensor 154 that senses flux lines from a magnet 156. The magnet 156 is movably disposed in an aperture formed in the housing 102. A push pin 158 is disposed between the piston 112 and the magnet 156 such that movements of the piston 112 are imparted to the magnet 156. A biasing member 160, for example a coil spring, disposed between the magnet 156 and the end of the aperture that biases the magnet 156 into engagement with the push pin 158 and in turn maintains engagement between the push pin 158 and the piston 112. Therefore, as the piston 112 moves back and forth, the magnet 156 moves therewith. The movements of the magnet 156 can be sensed by the sensor 154 by detecting the flux lines and their angular displacement relative to the sensor 154. The use of a sensor to sense magnetic flux of a magnet and thereby determine relative positions between the sensor and the magnet is known in the art.

The signals from the sensor 154 are interpreted by logic on the sensor chip 152 to determine the relative positions of the magnet 156 (and thus the piston 112) relative to the sensor 154. A signal, which can be determined a connection status or connection quality signal, is then generated by the logic on the sensor chip 152 to indicate a good or a bad connection based on the sensed relative positions, and the signal is relayed to a monitoring device (not shown) external to the connector 100.

In operation of the fluid connector 100, the mating part 140 is inserted into the coupler 100 (or the coupler 100 is inserted onto the mating part 140). Pressurized fluid is then introduced into the cavity 110 through the pilot port 108 to force the piston 112 to the left in FIGS. 9 and 12, thereby squeezing the seal 142 between the washers 144, 146 which extrudes the seal 142 to seal around and grip on the mating part 140 as shown in FIG. 12. Once a good seal between the seal 142 and the mating part 140 is achieved, fluid can then be allowed to flow between the fluid connector 100 and the mating part 140, for example through the connector 100 and into the mating part 140, or from the mating part 140 through the connector 100 and out through the port 134. If the pressurized fluid is removed from the cavity 110, the resiliency of the seal 142 as the seal 142 returns to its default or original shape will force the piston 112 back to its original position.

In addition, once it is determined that a good seal between the seal 142 and the mating part 140 is achieved, the user can zero the connector 100 to define a good connection state based on the corresponding relative positioning of the magnet 156 and the sensor 154 and the resulting signal that is output by the sensor 154. Zeroing can be done in any suitable manner. As the connector 100 is thereafter actuated time and time again, it can be determined when the connector 100 is connected to the mating part 140 once the correct expected signal is received from the sensor 154. If the seal 142 wears, and the piston 112 over travels and/or the piston is not returned back to its initial starting position by the resiliency of the seal 142, the expected signal from the sensor 154 will go bad signifying a problem with the sealing ability. The user would then know when to change the seal 142.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A fluid connector that detachably connects to a fluid system, comprising:
    a magnet connected to a linearly movable part of the fluid connector that detachably connects the fluid connector to the fluid system so that the magnet is movable with the linearly movable part; and
    at least one sensor mounted on the fluid connector that senses movements of the magnet;
    wherein the magnet is adjustably mounted to allow the position of the magnet on the linearly movable part to be adjusted relative to the linearly movable part.

2. The fluid connector of claim 1, wherein the linearly movable part comprises a cylindrical sleeve of the fluid connector or a piston of the fluid connector.

3. The fluid connector of claim 1, wherein the at least one sensor is adjustably mounted to allow the position of the at least one sensor to be adjusted relative to the fluid connector.

4. The fluid connector of claim 1, wherein the fluid connector includes an outer sleeve, a main body at least partially in and surrounded by the outer sleeve, a piston that is disposed at least partially within the main body, a connection mechanism that surrounds the piston and that is disposed at least partially within the outer sleeve; and the linearly movable part comprises a sleeve that surrounds the connection mechanism and the piston and that is surrounded by the outer sleeve.

5. The fluid connector of claim 1, wherein the magnet and the at least one sensor are spaced radially from a longitudinal axis of the fluid connector, and the longitudinal axis does not extend through the magnet or the at least one sensor.

6. A fluid connector that detachably connects to a fluid system, comprising:
    a magnet connected to a linearly movable part of the fluid connector that detachably connects the fluid connector to the fluid system so that the magnet is movable with the linearly movable part; and at least one sensor mounted on the fluid connector that senses movements of the magnet, wherein the fluid connector includes a cylindrical housing, and a sleeve partially disposed within the cylindrical housing; and the linearly movable part comprises a piston that is disposed within the cylindrical housing and that is at least partially surrounded by the sleeve.

7. A fluid connector that detachably connects a first fluid system to a second fluid system to transfer a fluid between the first fluid system and the second fluid system, comprising:

a cylindrical housing connected to the first fluid system, and a sleeve partially disposed within the cylindrical housing;

a connection mechanism connected to the housing, the connection mechanism detachably connecting the fluid connector to the second fluid system, the connection mechanism includes a movable part that moves in a longitudinal direction relative to the housing, the movable part comprises a piston that is disposed within the cylindrical housing and that is at least partially surrounded by the sleeve;

a magnet connected to the movable part; and at least one sensor mounted on the cylindrical housing that senses movements of the magnet as the movable part moves to determine a connection state of the fluid connector to the second fluid system.

8. The fluid connector of claim 7, wherein the magnet and the at least one sensor are spaced radially from a longitudinal axis of the fluid connector, and the longitudinal axis does not extend through the magnet or the at least one sensor.

* * * * *